US007389474B2

(12) United States Patent
Rettig et al.

(10) Patent No.: US 7,389,474 B2
(45) Date of Patent: Jun. 17, 2008

(54) LANGUAGE OR SCRIPT-BASED CHARACTER SET CONVERSIONS PER-APPLICATION PROGRAM

(75) Inventors: Bjorn C. Rettig, Redmond, WA (US); Yong Guo, Issaquah, WA (US); Houman Pournasseh, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 803 days.

(21) Appl. No.: 10/377,436

(22) Filed: Feb. 28, 2003

(65) Prior Publication Data
US 2004/0172601 A1 Sep. 2, 2004

(51) Int. Cl.
*G06F 7/00* (2006.01)
(52) U.S. Cl. .............................. 715/536; 704/2; 704/8
(58) Field of Classification Search ................ 715/536; 704/2, 8
See application file for complete search history.

(56) References Cited

U.S. PATENT DOCUMENTS

| 5,778,213 | A  | * | 7/1998  | Shakib et al.    | 703/27  |
|-----------|----|---|---------|------------------|---------|
| 5,787,452 | A  | * | 7/1998  | McKenna          | 715/536 |
| 5,793,381 | A  | * | 8/1998  | Edberg et al.    | 345/467 |
| 5,940,845 | A  | * | 8/1999  | Prager et al.    | 715/536 |
| 5,941,947 | A  | * | 8/1999  | Brown et al.     | 709/225 |
| 6,204,782 | B1 | * | 3/2001  | Gonzalez et al.  | 341/90  |
| 6,473,781 | B1 | * | 10/2002 | Skagerwall et al.| 709/201 |
| 6,480,867 | B1 | * | 11/2002 | Kwan             | 715/536 |
| 6,587,836 | B1 | * | 7/2003  | Ahlberg et al.   | 705/26  |
| 6,757,688 | B1 | * | 6/2004  | Leapaldt et al.  | 707/101 |
| 6,801,528 | B2 | * | 10/2004 | Nassar           | 370/389 |
| 6,823,225 | B1 | * | 11/2004 | Sass             | 700/94  |
| 7,100,166 | B2 | * | 8/2006  | Takatama et al.  | 719/318 |
| 7,110,750 | B2 | * | 9/2006  | Oishi et al.     | 455/414.1 |
| 7,278,100 | B1 | * | 10/2007 | Ehrman           | 715/264 |
| 2003/0011630 | A1 | * | 1/2003 | Knowlton et al. | 345/731 |

\* cited by examiner

*Primary Examiner*—Patrick N. Edouard
*Assistant Examiner*—Eric Yen
(74) *Attorney, Agent, or Firm*—Workman Nydegger

(57) ABSTRACT

A system and method that simulate a system locale for non-Unicode application programs having languages that do not correspond to the system locale, to appropriately convert text data via a character set according to the application's native language. A shim mechanism converts the data in a program's relevant function calls based on a character set codepage for the program that corresponds to the program's language. The conversion is performed on a program-by-program basis, whereby multiple programs can properly execute simultaneously, even when programs have different languages and thus different character set codepages. Automatic language detection is provided, when possible, to determine the appropriate system locale to simulate via a corresponding codepage table. A user interface in the form of a wizard is provided to associate selected script-dependent applications with the needed conversion information, and/or to manually receive a language when automatic detection is unsuccessful.

27 Claims, 10 Drawing Sheets

LANGUAGE OR SCRIPT-BASED CHARACTER SET CONVERSIONS PER-APPLICATION PROGRAM

FIELD OF THE INVENTION

The invention relates generally to computer systems, and more particularly to language-based character sets on computer systems.

BACKGROUND OF THE INVENTION

Contemporary operating systems, such as Microsoft Corporation's Windows® 2000 or Windows® XP operating system, provide application programs with the ability to work with the Unicode character set, which is a single binary character set for essentially all languages that is consistent world-wide. With Unicode, a character as viewed from the user's perspective has only one value (or unique combination of glyphs' values) that represents it in a computer system, whereby application programs' user interfaces input and output the exact characters that are intended by the user and the application program, independent of any particular language settings. For example, the Latin character capital letter "D" is represented by 0044 hexadecimal, whereas the Greek capital letter "Δ" (delta) is represented by 0394 hexadecimal; each glyph has a unique Unicode value. This is true even for characters that look the same in a given font, e.g., the Latin character capital letter "A" is represented by 0041 hexadecimal, whereas the Greek capital letter "Α" (alpha) is represented by 0391 hexadecimal.

For application programs that are not developed to work with the Unicode character set, referred to herein as script-dependent or codepage-based application programs, contemporary operating systems having natural language support provide a mechanism to convert the character set of the applications to Unicode and back, as set by the administrator of the system. For example, a computer system can be set to use a Latin-based character set (i.e., Latin-based script), Greek, Cyrillic, Arabic, Hebrew and so forth. Depending on the character set that is active, a character having a single value from the perspective of an application program may, when converted, have different values to the operating system and thus, for example, appear differently to the user at different times.

To set the operating system to use a particular character set, a system locale variable is provided that an administrator can set, which the system then uses to determine the current language setting. More particularly, in some operating systems that support natural languages, the current value of the system locale variable determines which (if any) codepage is active, wherein a codepage comprises an internal table that the operating system uses to map symbols (e.g., letters, numerals, punctuation characters, glyphs and so on) to a number, such as a Unicode value. Different codepages thus provide support for the character sets used by different languages, e.g., the codepage identified by the value (Windows®) 932 represents the Japanese (Kanji) character set (and also supports hirgana and katakana character sets), while Windows® codepage 950 represents one of the Chinese character sets. As a result, the encoding value 95 hexadecimal will be converted to one Unicode character when one codepage is active, for example, and a different Unicode character when a different codepage is active. Note that the codepage is not necessarily per-language, as a given character set may support more than one language, e.g., the same Cyrillic codepage may be used for Russian and Serbian languages, which share the same script.

In general, the conversion to and from Unicode is thus accomplished on a system-wide basis via the operating system, which converts non-Unicode (script-dependent) characters to Unicode characters and vice-versa via the codepage table that is currently active, as determined by the system locale variable. In this manner, the system locale setting on a given machine enables programs that do not support Unicode to display menus and dialogs in their native language by installing the necessary codepages, and fonts.

However, while such operating systems thus support different languages, there are a number of problems with this present language support mechanism. In particular, non-Unicode programs designed for one system locale setting (and its corresponding codepage) will not work as intended with another system locale setting (and its corresponding codepage, which is different). For example, with an incorrect system locale setting, such a non-Unicode, script-dependent program will display characters that are meaningless (incomprehensible) relative to its intended language.

In many situations, the problem of having a mismatched active codepage for a given application program cannot be solved simply by changing the system locale setting. For one, in contemporary operating systems, not every user is authorized and/or capable of changing the system locale, as this requires administrator privileges and a certain level of familiarity with the operating system. Most corporations, educational institutions and other entities do not let users operate their systems as administrators. In such situations, an administrator must be found to change the system locale for a user, even if the user only wants the setting changed temporarily. Even with an administrator-level user or an administrator conveniently present, changing the system locale requires a reboot, which is inconvenient at best, and can also lead to lost data and other problems.

Another significant problem is that the system allows only one system locale to be set in the system at a time. As a result, (excepting the ASCII character set, which is shared by codepages for the lowest 128 characters (0 to 7F hexadecimal)), a user cannot properly run two programs that each have different languages at the same time, e.g., the system can have the Japanese codepage active, or the Russian codepage active, but not both codepages active at the same time. Thus, one of these two programs will not function properly, depending on which codepage is active.

SUMMARY OF THE INVENTION

Briefly, the present invention provides a system and method that simulate a system locale for script-dependent (e.g., non-Unicode) application programs, to provide the correct conversion or other information whenever an application's needed language is different from the system locale that is currently set in the system. The mechanism enables each application program to have a character set conversion table (e.g., codepage) that is different from that character set conversion table which is active in the system.

In one implementation, relevant function calls and their callbacks are hooked to redirect them to a layer that performs the appropriate conversion between script-dependent application data (e.g., codepage-based text) and data of a unified and universal character set (e.g., Unicode data), whenever the language needed by an application program differs from the system locale that is currently set in the system. For purposes of simplicity, such a character set and its data will be referred to as "unified" herein. The simulation is performed on a program-by-program basis, whereby multiple programs can properly execute simultaneously, even when each has a different associated language.

The present invention can automatically detect or be manually informed of the language of the script-dependent application program, and simulate the needed system locale via an appropriate codepage table. A user interface in the form of a wizard is provided to associate selected script-dependent applications with the needed conversion information, including automatically detecting their language, and/or to manually receive a language when automatic language detection is unsuccessful.

Once the language is known, appropriate function calls and/or other communications to and from the script-dependent application are hooked to convert appropriate script-dependent data to unified character set (e.g., Unicode) data. In one implementation, (in which the hooking of functions is facilitated by shim technology provided by the operating system), a shim layer handles hooking the communications for multiple application programs that each need data conversion. In an alternative implementation, a shim layer instance is provided to hook the communications for each application program that needs data conversion.

Other advantages will become apparent from the following detailed description when taken in conjunction with the drawings, in which:

DETAILED DESCRIPTION

Exemplary Operating Environment

Figure 1:
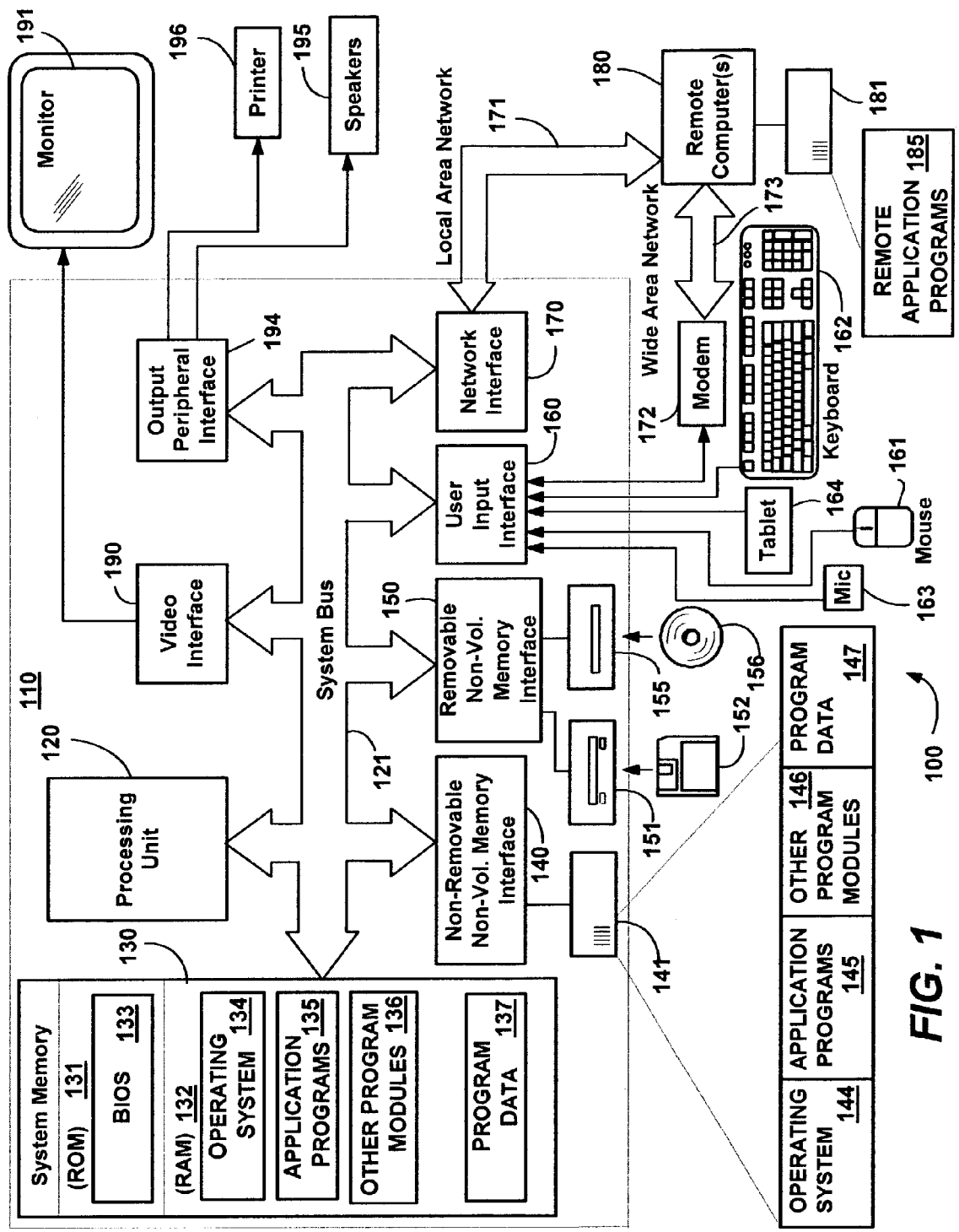
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Application Program Locale

The present invention is generally directed towards simulating a system locale for script-dependent (e.g., non-Unicode) application programs, to provide the correct conversion whenever an application's needed language is different from the system locale that is currently set in the system. The simulation is performed on a program-by-program basis, (which may be per process or per-thread), whereby multiple programs can (properly) execute simultaneously, each with a different character set support. As used herein, such a simulated locale may be referred to as a program-specific language (corresponding to a locale) or per-program language (to differentiate it from the system-wide locale).

Figure 2:
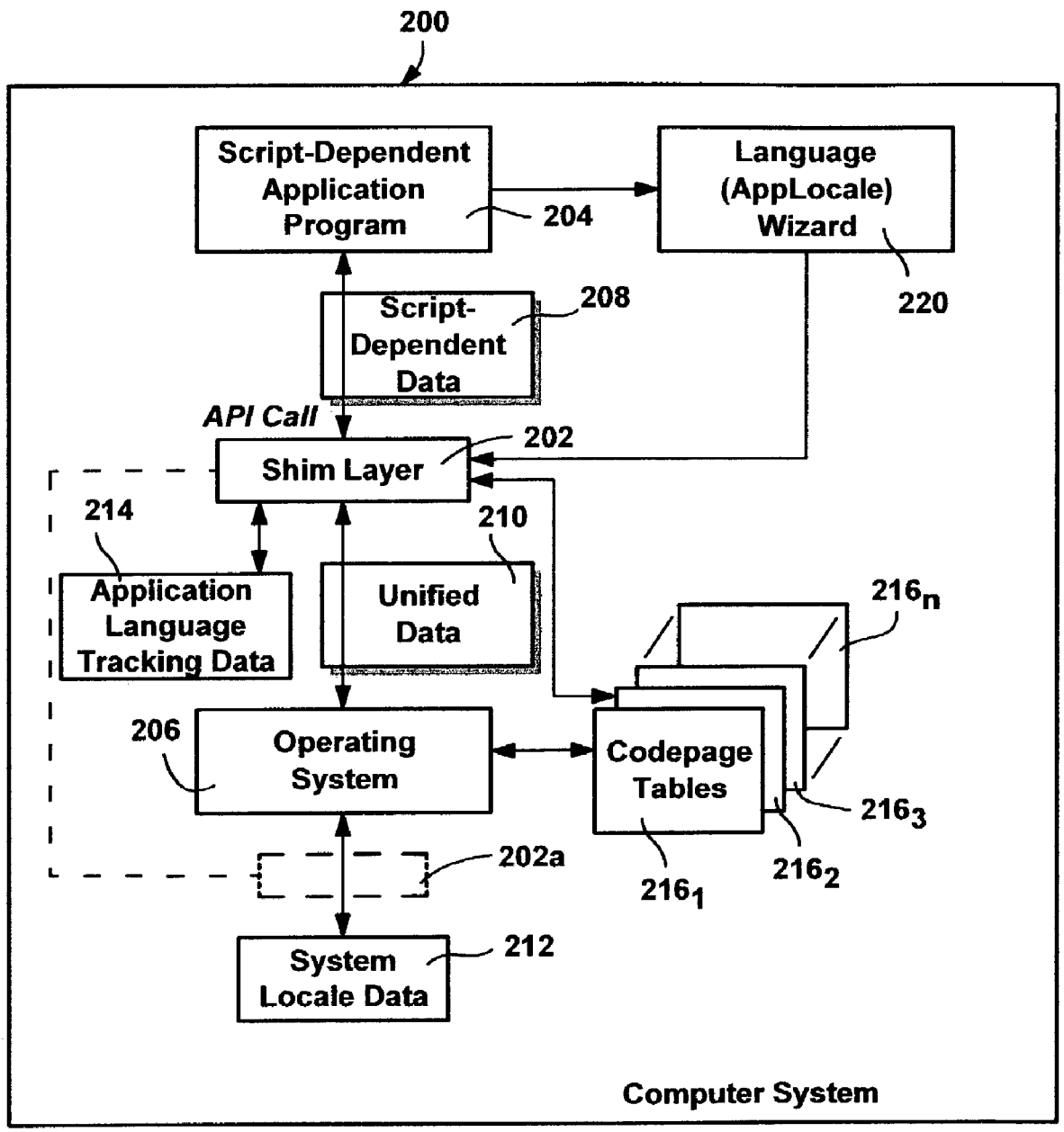
FIG. 2 is a block diagram generally representing a computer system arranged with a mechanism that converts script-dependent character set data to and from unified character set data, in accordance with an aspect of the present invention.

As generally represented in FIG. 2, in one implementation, application components and functionality in a computer system 200 constructed in accordance with aspects of the present invention may include a shim layer 202 that logically intercepts communications (e.g., API calls, callbacks and/or other message passing) between an application program 204 and an operating system 206. Data conversion between script-dependent data and unified character set data is performed in the shim layer 202. In FIG. 2, such script-dependent data and unified data is represented as data 208 and 210, respectively.

Note that such hooking of function calls may be performed in any number of ways. For example, in a Windows® XP environment, shim technology provides a mechanism for redirecting API calls to other functions, in this case, functions of the shim layer 202 that convert script-dependent (e.g., codepage-based) request data to unified character set (e.g., Unicode-based) request data, and then likewise convert unified character set callback data to script-dependent callback data. The shim technology essentially comprises a dynamic hooking harness, in which a list of one or more application programs that need to have their calls hooked may be identified by the user and have a predefined set of hooking messages applied. In general, this enables the present invention to be implemented in a system without modifying the low-level operating system code, which is often not possible and/or desirable. However it is alternatively feasible to provide a similar mechanism via message hooking and modifying the low-level operating system code. Shim technology and similar hooking techniques are documented, and are thus not described in detail herein for purposes of simplicity.

For a script-dependent program 204 that differs in language requirements from the locale that is currently set for the system, as set in the system locale data (e.g., in system variable) 212, the shim layer 202 uses appropriate program-specific language data such as a tracking variable 214 corresponding to the program 204, and uses a corresponding codepage table such as $216_2$ or equivalent data structure to convert the script-specific (e.g., codepage-based) data to unified data, or vice-versa. Note that in an implementation in which a single shim layer can handle multiple applications (as in FIG. 3, described below), the application locale tracking data may comprise a mapping for each script-dependent application program that requires conversion to the appropriate codepage table for that application, so that the appropriate codepage table can be quickly determined. The needed codepage or codepages data may also be loaded internally into the shim layer 202. In an alternative implementation in which each application requiring conversion has its own instance of a shim layer, (as in FIG. 4, described below), each shim layer instance can simply store a pointer or the like to the appropriate codepage table, or internally load a copy of the appropriate codepage. Note that the mapping or codepage may be maintained internal or external with respect to the shim layer. Further note that the system (e.g., via the application's process data) can pass the codepage mapping to the shim layer 202 with each call, whereby the application's process data rather than the shim layer 202 tracks the appropriate codepage table to-be-referenced.

To initially determine which codepage to use for a given application program, a user interface in the form of a wizard 220 attempts to automatically detect language information for each application. If unsure as to whether the automatically detected language is correct or if otherwise unable to detect it, the language information may be manually provided by a user for that program.

For each script-dependent application program needing conversion, when a function call is redirected to the shim layer 202, the shim layer 202 uses the corresponding codepage table (e.g., $216_2$) to convert the script-dependent text provided by the application program to the unified text format used by the operating system components 206, such as Unicode, and converts the other way for communications in the other direction. In this manner, the operating system 206, which uses the unified text format as its default encoding, is essentially given the impression that script-dependent applications are actually unified character set-based applications. A significant advantage provided by the present invention is that any operating system components 206 that are configured to perform their own codepage-to-unified character set (or similar) conversions when appropriate, will only see unified character set data from the application program 204 via the shim layer 202, and thus will not attempt any internal operating system conversion.

It should be noted that not every function (API) call by the application program needs to be hooked, only those which require such text conversion. Further, as described below, some of the APIs may essentially bypass the shim layer 202. To handle such APIs, as also represented in FIG. 2 by the dashed box 202a, the shim layer can also intercept other calls such as operating system requests for the system locale variable, and for applications needing different codepage data relative to the system-wide codepage, return a value indicative of a codepage to use that is different from what the system locale data would return.

In this manner, without changing the system locale variable setting, an application program needing a different setting can properly execute. By way of example, consider a user running an English version of an operating system with the default system locale set to English-US (e.g., corresponding to Windows codepage 1252 in a Windows®-based system). If the user wants to run a Japanese application that is script-dependent (i.e., codepage-based), without the shim layer, the user would have to set the system locale to Japanese (e.g., corresponding to Windows codepage 932) and reboot the machine. This assumes that the user has the security rights (e.g., of an administrator) to force this setting change, and is willing to reboot the system. With the shim layer, the user can simply run the application, and the system will automatically detect the need to simulate the Japanese language setting, or ask the user for the language corresponding to the program, whereby the language is known and the proper language is simulated.

By way of another example, consider an educational center in Israel that has its computer systems running localized Hebrew versions of an operating system, with a default system locale set to Hebrew (e.g., corresponding to Windows® codepage 1255). This allows non-Unicode, Hebrew-specific applications to run properly. However, if this example educational center also offers Arabic courses that use a non-Unicode, Arabic-specific application, (e.g., corresponding to Windows® codepage 1256), without the shim layer, this Arabic application cannot run properly unless the system locale of the machine is changed to Arabic, and a reboot performed. However, in this new configuration, existing Hebrew legacy application programs will stop functioning properly. With the shim layer present as represented in FIG. 2, the user can properly run both Hebrew and Arabic legacy applications at the same time.

Moreover, in accordance with one aspect of the present invention, the per-application conversion mechanism of the present invention also allows multiple applications having different conversion requirements to simultaneously execute, with any conversion properly performed for each. To this end, in one alternative implementation as represented in FIG. 3, because a shim layer 302 handles the conversion on a per-program basis, as represented in FIG. 3, two or more programs that have language requirements that differ from one another as well as from the system locale may run at the same time, yet function properly.

Figure 3:
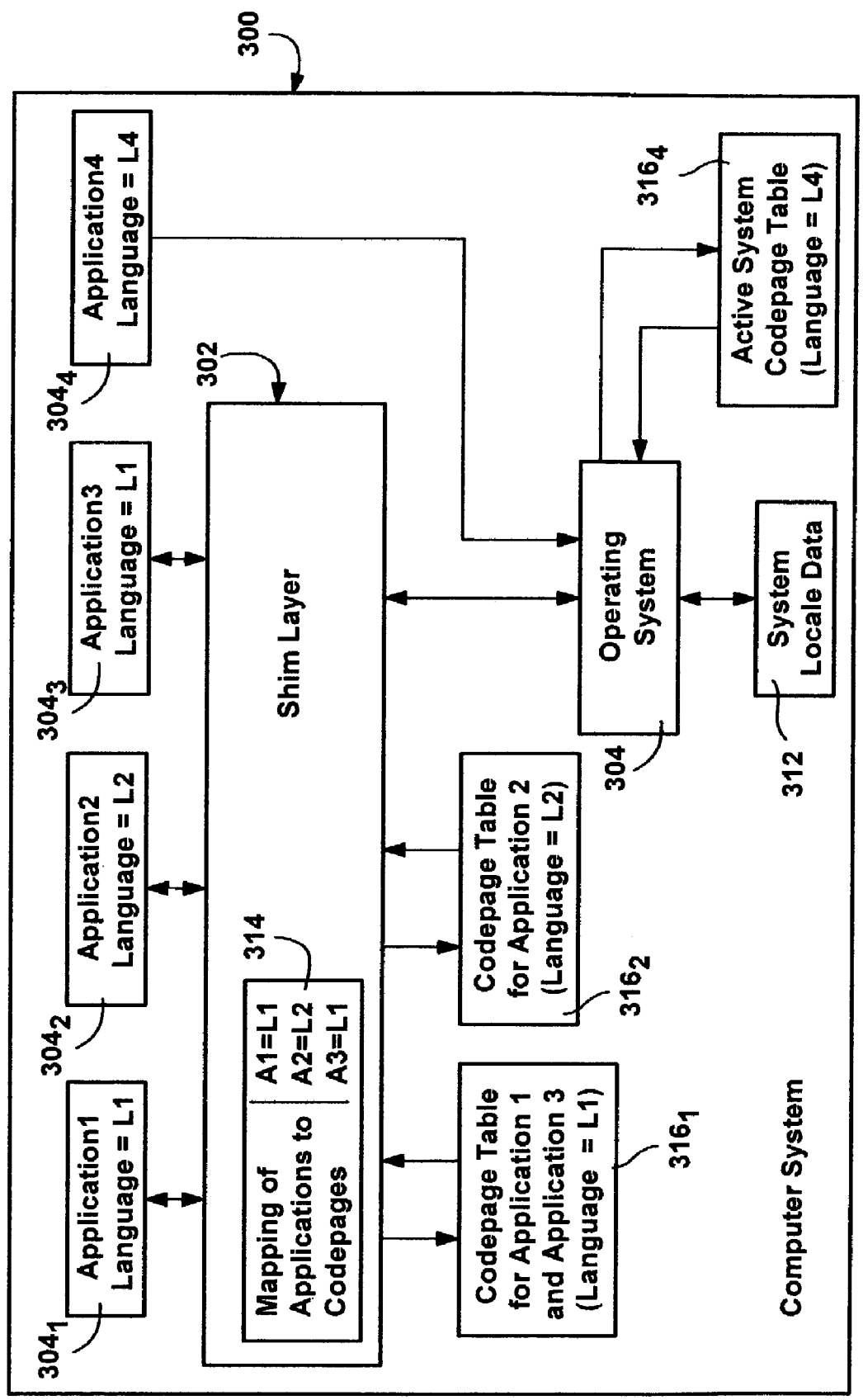
FIG. 3 is a block diagram generally representing an example implementation with a single mechanism for multiple applications that converts script-dependent character set data to and from unified character set data, in accordance with an aspect of the present invention.

For example, as represented in FIG. 3, (in which like components to those in FIG. 2 are numbered 3xx rather than 2xx) the shim layer 302 maps each application program $304_1$-$304_3$ needing conversion to the appropriate codepage for that program's language. Note that application programs $304_1$, and $304_3$ have the same script (possibly but not necessarily the same language) whereby the shim layer 304 can share the codepage table $316_1$, for each application program. Further, note that the application program $304_4$ has a language that matches the system-wide locale setting 312 and thus can bypass the shim layer and have conversion performed by the operating system's conversion mechanism that uses active system codepage table $316_4$. In such a case, the shim layer 302 need not perform any conversion, and if not otherwise needed for other application programs, can terminate. Notwithstanding, the shim layer can, if desired, be written to convert even such matching applications.

Figure 4:
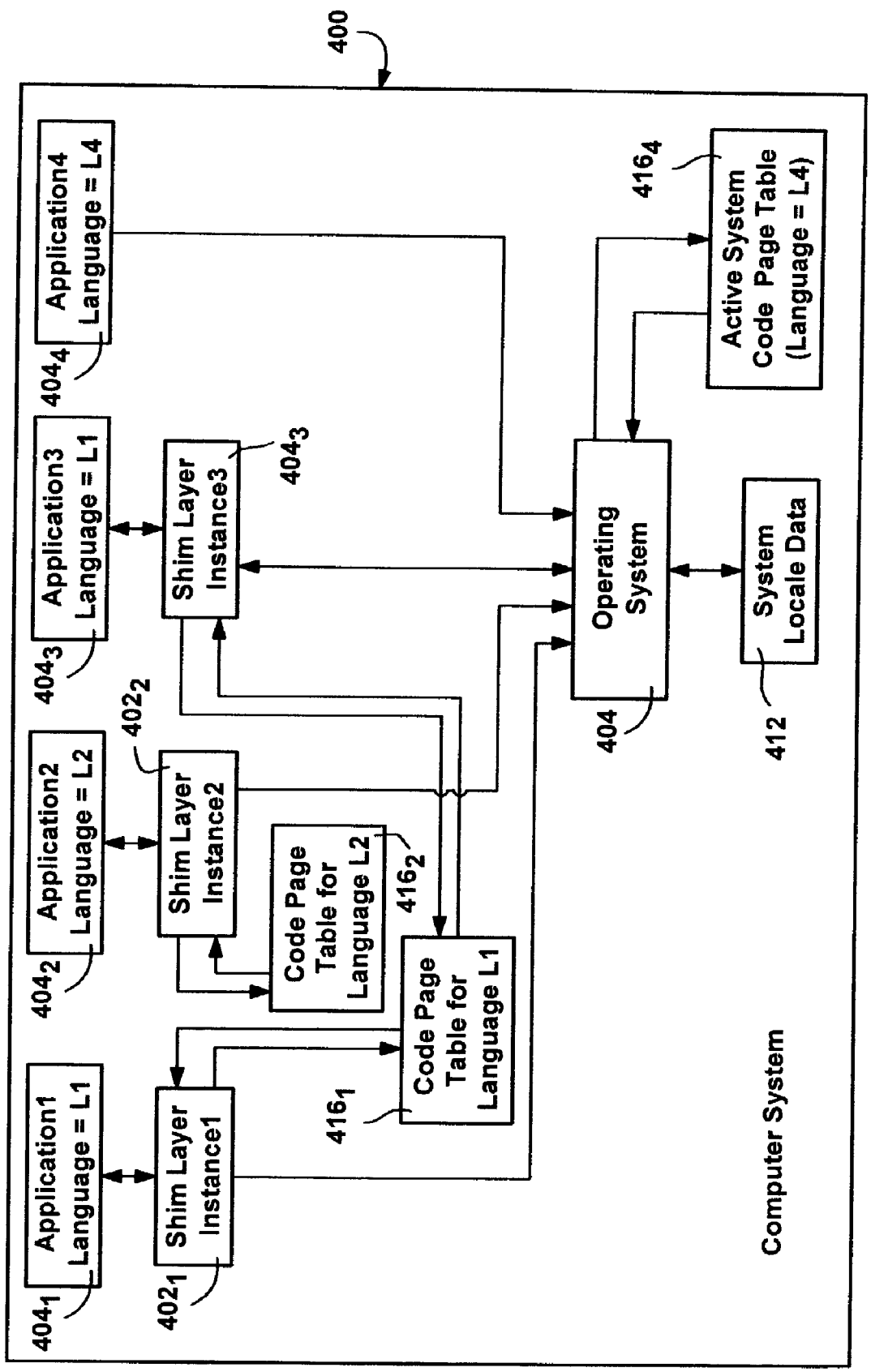
FIG. 4 is a block diagram generally representing an alternative example implementation with multiple instances of mechanisms that convert script-dependent character set data to and from unified character set data, in accordance with an aspect of the present invention.

In an alternative implementation as represented in FIG. 4, (in which like components to those in FIG. 3 are numbered 4xx rather than 3xx), instead of having one shim layer handle conversions for multiple applications, a shim layer instance may be provided for each application program that requires a conversion (external to the operating system). Thus, each application program $404_1$-$404_3$ needing conversion has a corresponding shim layer instance $402_1$-$402_3$ that converts text characters via an appropriate codepage $416_1$-$416_3$ for that program's language. Again, as in FIG. 3, note that the application program $404_4$ needs conversion, but has a language that matches the system-wide locale setting 412, and thus can use the operating system's conversion mechanism with the active system codepage table $416_4$. In such a case, no shim layer instance is needed for the application program $404_4$.

In accordance with one aspect of the present invention, the user can selectively activate the application locale conversion mechanism on a per-application basis. Note that in one implementation, the present invention is not active in systems by default, whereby when dealing with script-dependent applications, the system by default will use the codepage identified by the system locale variable to perform any needed character conversions to and from the operating system. Once the application locale conversion mechanism is turned on for a given application, (e.g., via FIGS. 7 and 8) the wizard 220 attempts to detect the language of the application program and to automatically select the codepage to be used, by checking the language of the version stamping of the application. However, this is not always an adequate solution since many applications do not correctly provide the version stamping. In this case, the user is provided with the ability to select a language from a list, (e.g., via a drop-down selection mechanism as in FIG. 9) with each available language corresponding to the supported codepages on the system. Note that if the automatic detection process returns a codepage that is not installed on the computer system, the user may be prompted, to inform the user of the problem and/or instruct the user as to how to install the missing language support package.

Once an application is designated for conversion, upon a call to the function (e.g., CreateProcess) that triggers the start of that application, the shim layer is launched. The conversion mechanism of the shim layer then performs text data conversions when interfacing with the given application by monitoring a number of system calls and settings, including the codepage setting. For example, in one implementation with an NLS-capable (Natural Language Support) operating system, the global variable gAnsiCodePage establishes the current active codepage active codepage defined in kernel32.dll. Changing this variable setting can change the active codepage for the NLS APIs, while the function SetCPGlobal can be used to change the gAnsiCodePage variable. The codepage setting in NTDLL may also be monitored in which the active codepage (NLS codepage table) will be loaded during system boot. Another group of APIs in NTDLL have similar functions as the NLS APIs, e.g., RtlMultiByteToUnicodeN is similar to a MultiByteToWideChar conversion API, but it does not have a codepage input parameter. The codepage setting in the kernel also has a group of NLS APIs (in base\ntos\rtl), which are similar to the NTDLL APIs. Note that some non-Unicode APIs directly enter into the kernel, such as GetWindowTextA. For these APIs, the kernel API set cannot be shimmed, but instead the appropriate non-Unicode APIs are shimmed.

Other functions that are shimmed include GetSystemDefaultLCID, in which a GetSystemDefaultLCIDLie shim returns the locale identifier (LCID) as expected. As can be appreciated, this simulates an environment in which the system locale variable was set to the application's language (locale) value, even though it is set to a different locale. If the application requests the codepage directly from the system registry, a VirtualRegistry shim intercepts the call to return the expected active codepage to application. A GetSystemMetrics shim tells Far East applications that the system is DBCS-(double-byte character sets) enabled. A GetTextFaceA shim returns localized font face name.

Windows Message handling will also be shimmed so that message related APIs such as WndProc, CallWindowProcA, SendMessageA, and so forth will be shimmed, e.g., to make sure that system-provided Unicode strings are correctly handled in a non-Unicode (codepage-based) application.

The following table includes a number of API functions that are shimmed:

```
APIHOOK_ENUM_BEGIN
    APIHOOK_ENUM_ENTRY (RtlMultiByteToUnicodeN)
    APIHOOK_ENUM_ENTRY (RtlAnsiStringToUnicodeString)
    APIHOOK_ENUM_ENTRY (RtlUnicodeToMultiByteN)
    APIHOOK_ENUM_ENTRY (RtlUnicodeStringToAnsiString)
    APIHOOK_ENUM_ENTRY (RtlOemToUnicodeN)
    APIHOOK_ENUM_ENTRY (RtlOemStringToUnicodeString)
    APIHOOK_ENUM_ENTRY (RtlUnicodeToOemN)
    APIHOOK_ENUM_ENTRY (RtlUnicodeStringToOemString)
    APIHOOK_ENUM_ENTRY (RtlUpcaseUnicodeToMultiByteN)
    APIHOOK_ENUM_ENTRY (RtlUpcaseUnicodeToOemN)
    APIHOOK_ENUM_ENTRY (MultiByteToWideChar)
    APIHOOK_ENUM_ENTRY (WideCharToMultiByte)
    APIHOOK_ENUM_ENTRY (RtlCreateUnicodeStringFromAsciiz)
    APIHOOK_ENUM_ENTRY (GetSystemMetrics)
    APIHOOK_ENUM_ENTRY (DialogBoxParamA)
    APIHOOK_ENUM_ENTRY (CreateWindowA)
    APIHOOK_ENUM_ENTRY (CreateWindowExA)
    APIHOOK_ENUM_ENTRY (CallWindowProcA)
    APIHOOK_ENUM_ENTRY (SetWindowTextA)
    APIHOOK_ENUM_ENTRY (GetWindowTextA)
    APIHOOK_ENUM_ENTRY (SendMessageA)
    APIHOOK_ENUM_ENTRY (DefWindowProcA)
    APIHOOK_ENUM_ENTRY (GetTextFaceA)
    APIHOOK_ENUM_ENTRY (SetWindowLongA)
    APIHOOK_ENUM_ENTRY (ModifyMenuA)
    APIHOOK_ENUM_ENTRY (GetMenuStringA)
    APIHOOK_ENUM_ENTRY (GetWindowTextLengthA)
APIHOOK_ENUM_END
```

Figure 5:
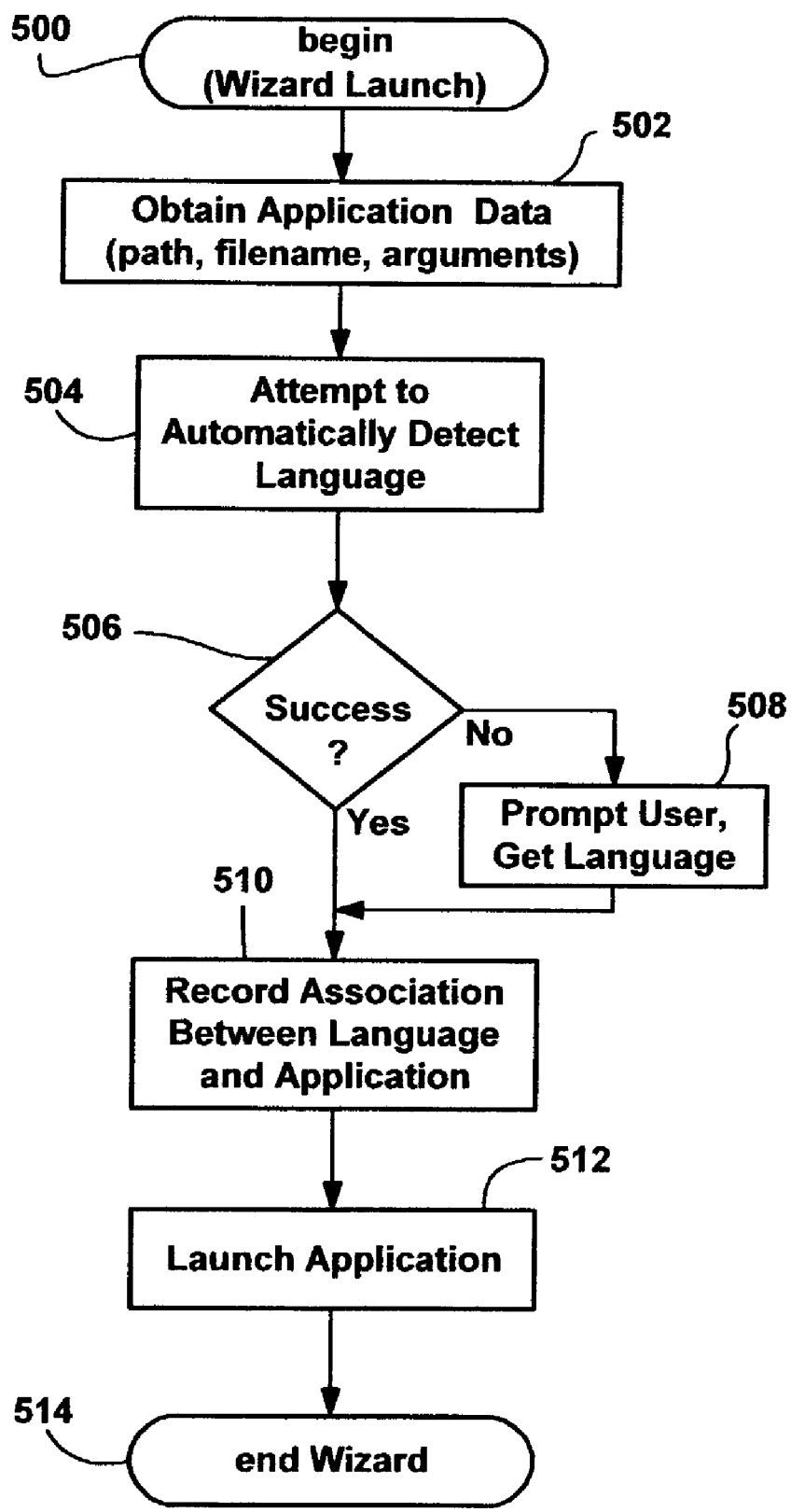
FIGS. 5 and 6 comprise flow diagrams generally representing overall logic for providing per-program character conversion in accordance with aspects of the present invention.
Figure 6:
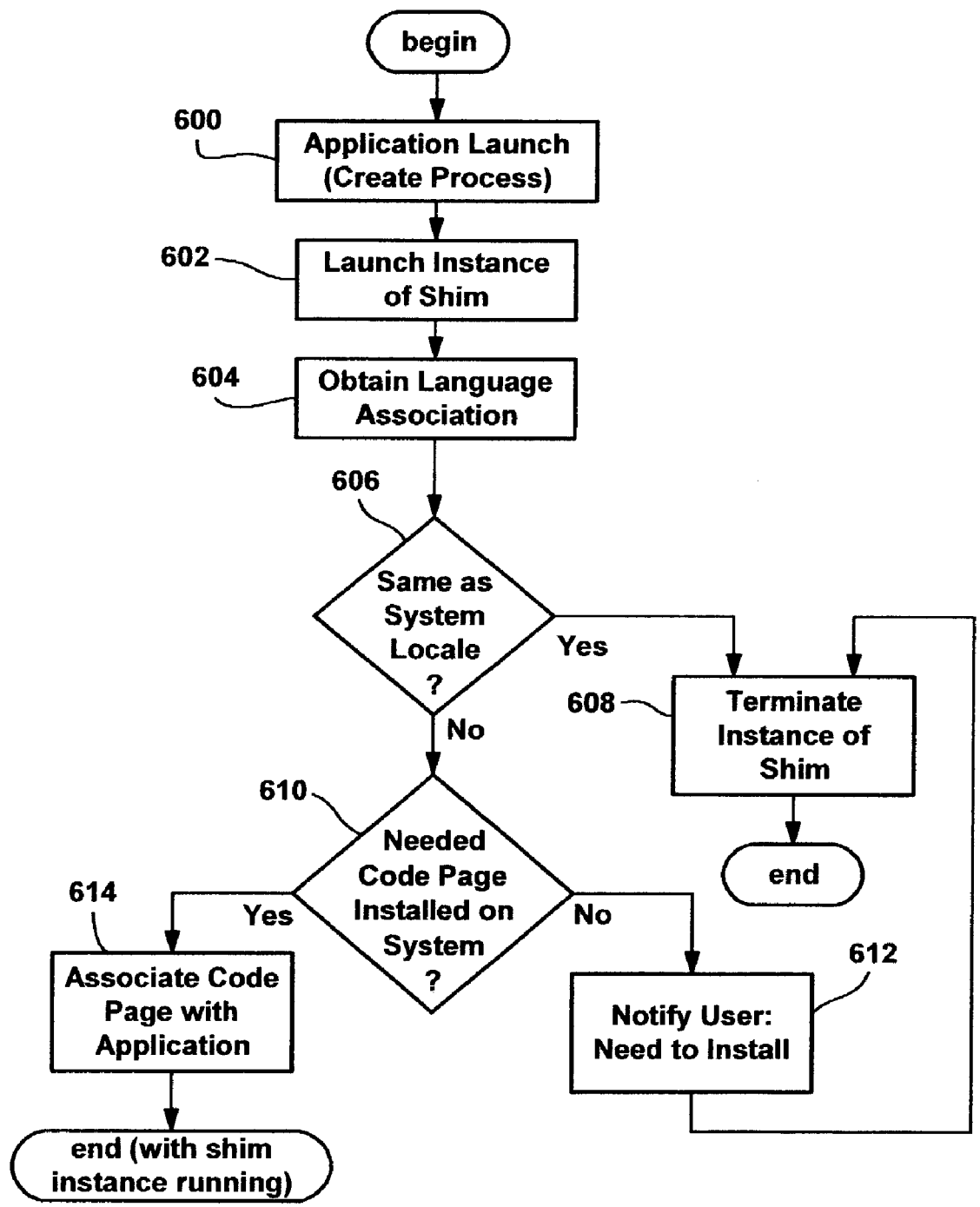

Turning to an explanation of the operation of the invention with particular reference to FIGS. 5 and 6, the wizard is launched, as represented by step 500, to enable the user to identify (via step 502) an application program that needs data conversion, that is, at times when the system locale variable is not set to a value that corresponds to the script the program needs. For purposes of the present example, the wizard (as in FIGS. 7-10) will be launched on a per-application basis. Note that it is alternatively feasible to provide a user interface that is separate from any program, such as to enable a user to list at one time more than one application that requires data conversion.

Figure 10:
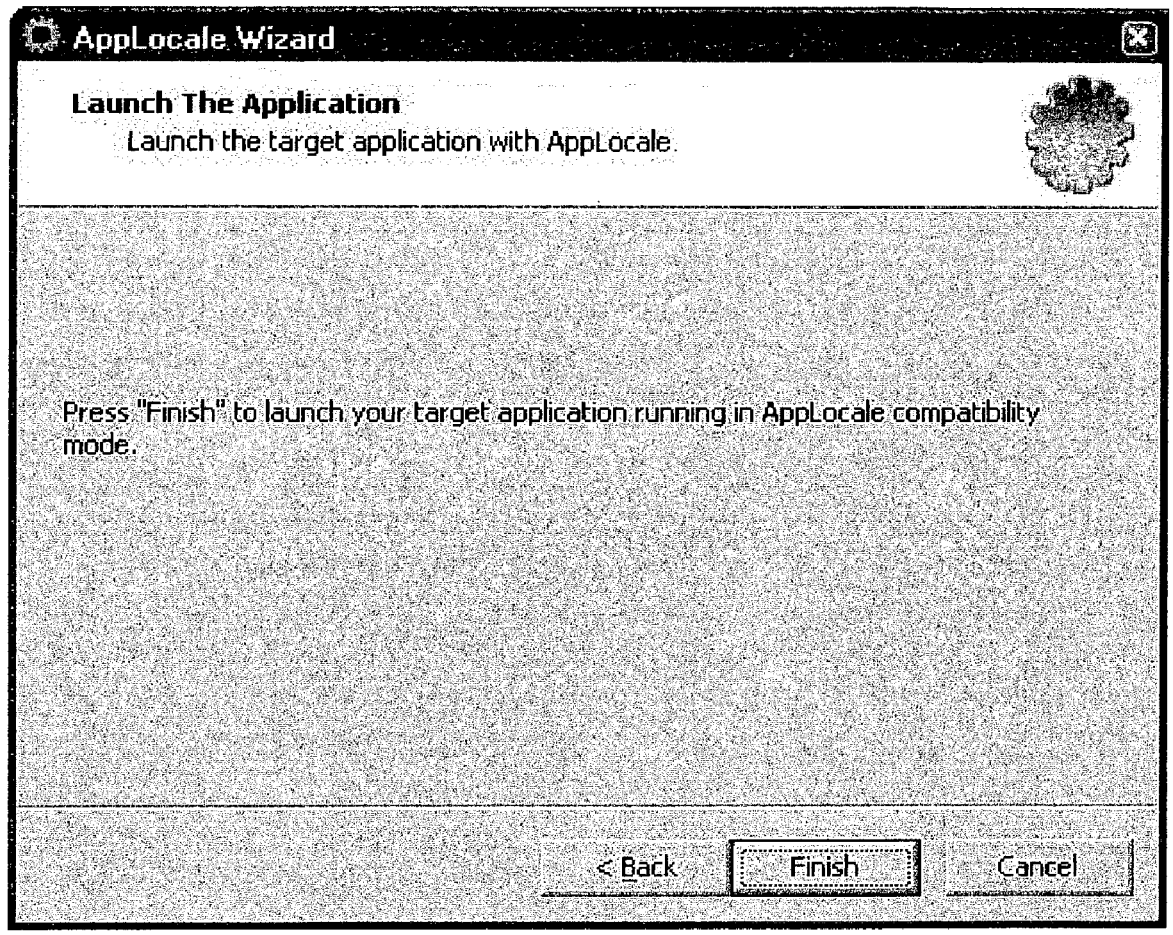

Step 504 represents the application locale wizard attempting to automatically detect the current language of the application, which is ideally stamped properly in the identified application. However, often applications do not have the language correctly stamped, which can be detected. For example, if the language is stamped as English, then the user ordinarily would not need any language conversion, since, as mentioned above, the ASCII character set is already shared by most codepages for the lowest 128 characters (0 to 7F hexadecimal). The fact that the user has still requested language conversion indicates that the application's language is likely incorrectly stamped as English. In such an event, or upon similar types of error detection, (e.g., the application is stamped with an invalid or unrecognized value), the user will be prompted to manually select a language, as represented in FIG. 5 by steps 506 and 508. Note that as represented in FIG. 10, this association may be recorded (e.g., in the registry) so that the user does not have to re-enter the language information upon each running of the program.

Step 512 represents launching the application program. The wizard is then terminated at step 514. As mentioned above, the wizard is thus run once per application program, although alternatives are feasible, e.g., allow the user to identify as many programs as desired, detect or obtain and then record the language for each, launch any one or ones that the user selects for launch, and so forth.

FIG. 6 operates when an application that has been previously designated for conversion is launched, whether by the wizard (at step 512) or conventionally launched. When an application is launched, a function (e.g., CreateProcess) is called in the system, as represented by step 600. For such an application program, the system will also launch the shim layer at step 602, which may be a per-application instance, (or if a shim runs for multiple applications, will be launched if not already running). For purposes of the present example, the shim will be treated as a per-application instance (as represented in FIG. 4), since this also covers the situation in which a multiple-application shim needs to be launched (as in FIG. 3). Note that for an implementation in which a multiple-application shim is already running, the system can instead notify the multiple-application shim upon a new application being started that may need conversion, use reference counts or the like to terminate the shim when no longer needed, and so forth.

Step 604 represents the shim obtaining the language association. This may be passed by the system as a launch parameter, or the shim can obtain it in some other manner, e.g., look it up based on the identity of the application program for which the shim layer is running.

Step 606 represents testing whether the application's language is that of the system locale. If so, the shim is not needed for this application, and step 606 branches to step 608, which represents terminating the instance of the shim. Note that shim instance is also terminated when the application process terminates.

In the event that the application's language does not correspond to the system locale setting, step 606 branches to step 610 where the required codepage is evaluated. In the event that the system does not have this codepage available, e.g., the system is not multiple language ready, step 610 branches to step 612 where the user is notified of the need to install the language support. Otherwise, step 610 branches to step 614 to associate the correct codepage with the application program, which may, for example, provide a pointer in the shim or load the codepage itself into the shim. The process then ends with the shim running, hooking function calls as generally described above.

Note that while hooking a request, the shim may perform some other operations in addition to converting codepage-based text to Unicode text and Unicode to codepage-basd text. For example, if the application passes flags and other parameters that are script-dependent rather than based on the unified character set, the shim may adjust the parameters and flags as needed to avoid confusing the operating system. For example, if a flag in a function call to the operating system indicated codepage-based data and not Unicode data, the flag value would be toggled by the shim to indicate Unicode and not codepage-based. As another example, a call to the system to get the current system locale (or current codepage) value would change the variable value, not convert text.

Figure 7:
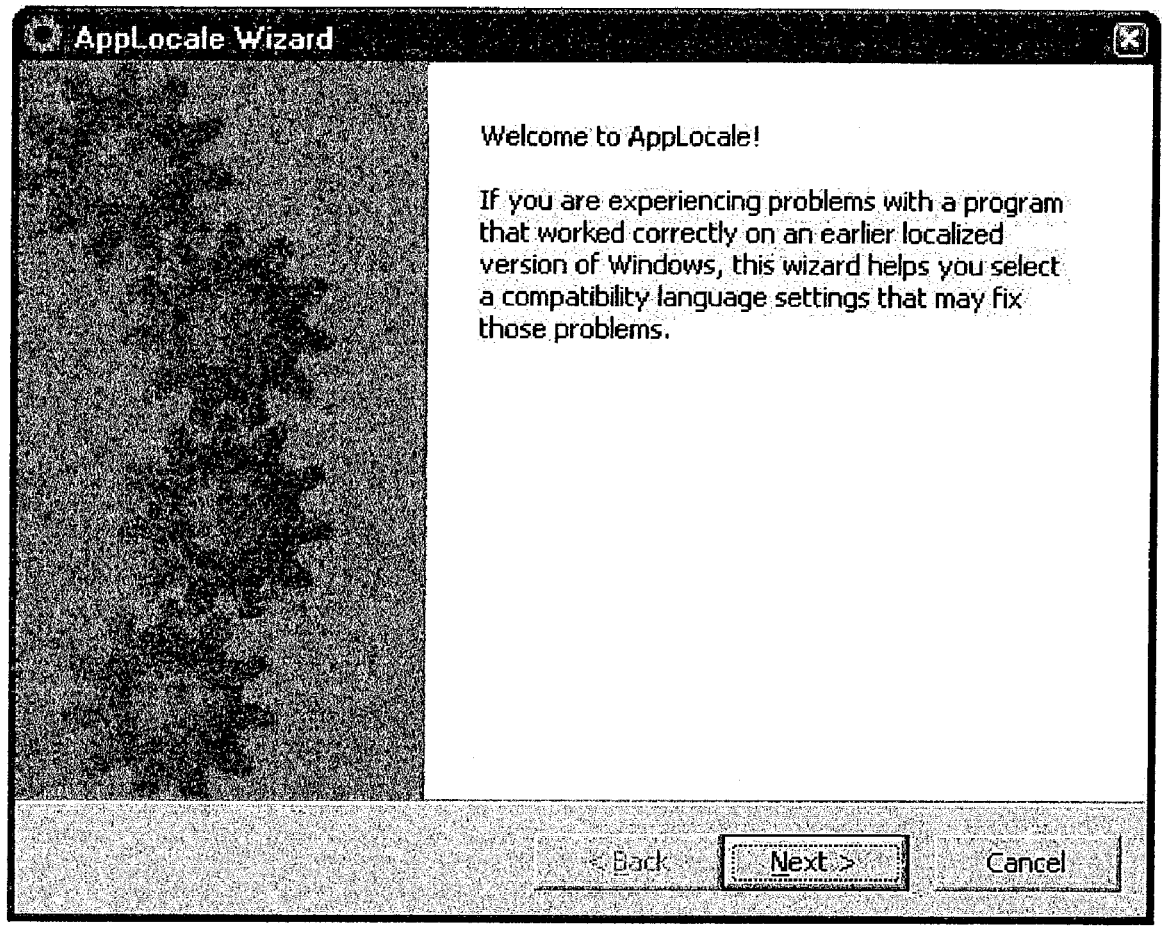
FIGS. 7-10 are representations of a user interface in the form of a wizard for associating per-application program character conversion in accordance with an aspect of the present invention.
Figure 8:
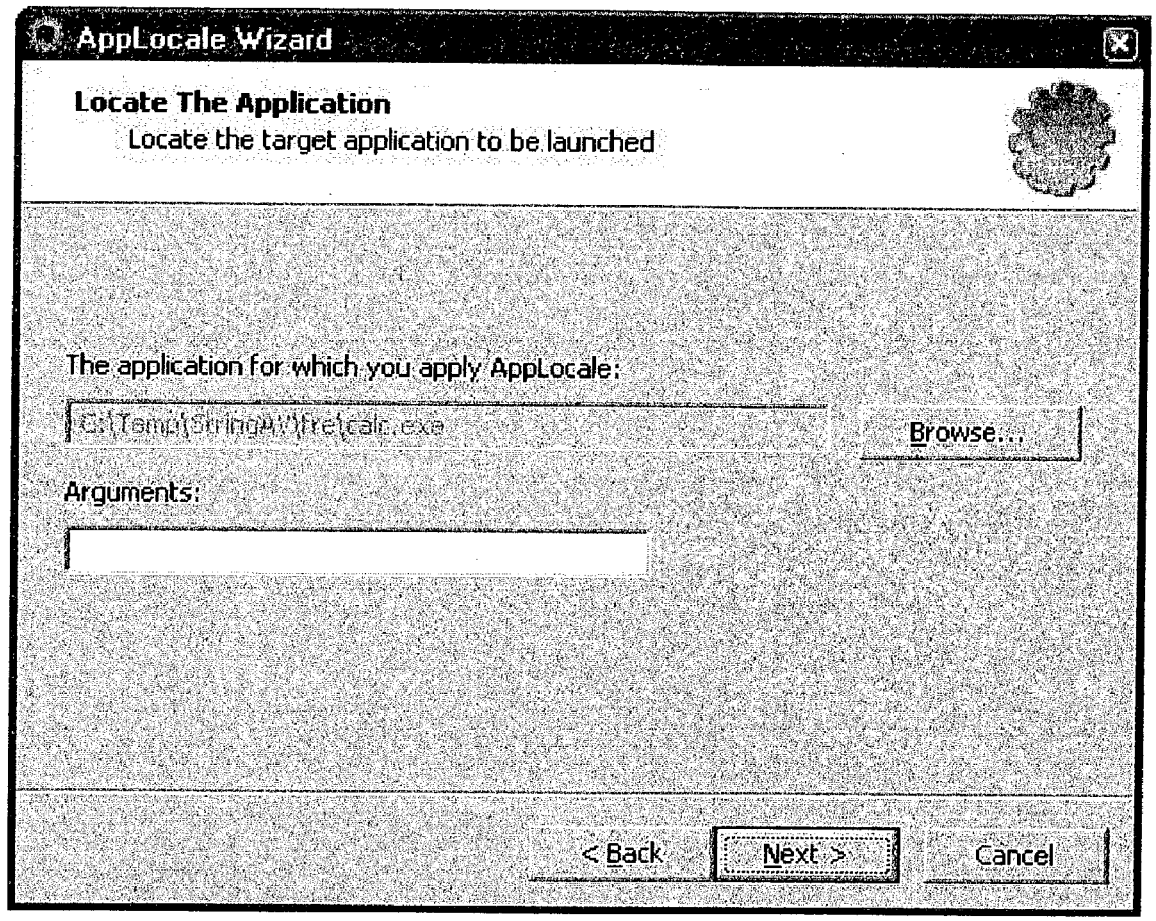

Turning to an explanation of the operation of the user interface, FIGS. 7-10 represent example user interfaces in the form of a wizard that a user can use to set a language for a selected application program. As described above, the user interface may comprise part of the shim (but can be independent thereof) and detects the location and the language of the application. Note that because the English language (United States location) codepage is a subset of other codepages, an English non-Unicode application can be run on different system locale environments without problems. FIG. 7 shows an introductory screen, in the English language with Latin characters, but may itself be localized for a user, while FIG. 8 provides an interface for selecting the application program.

Figure 9:
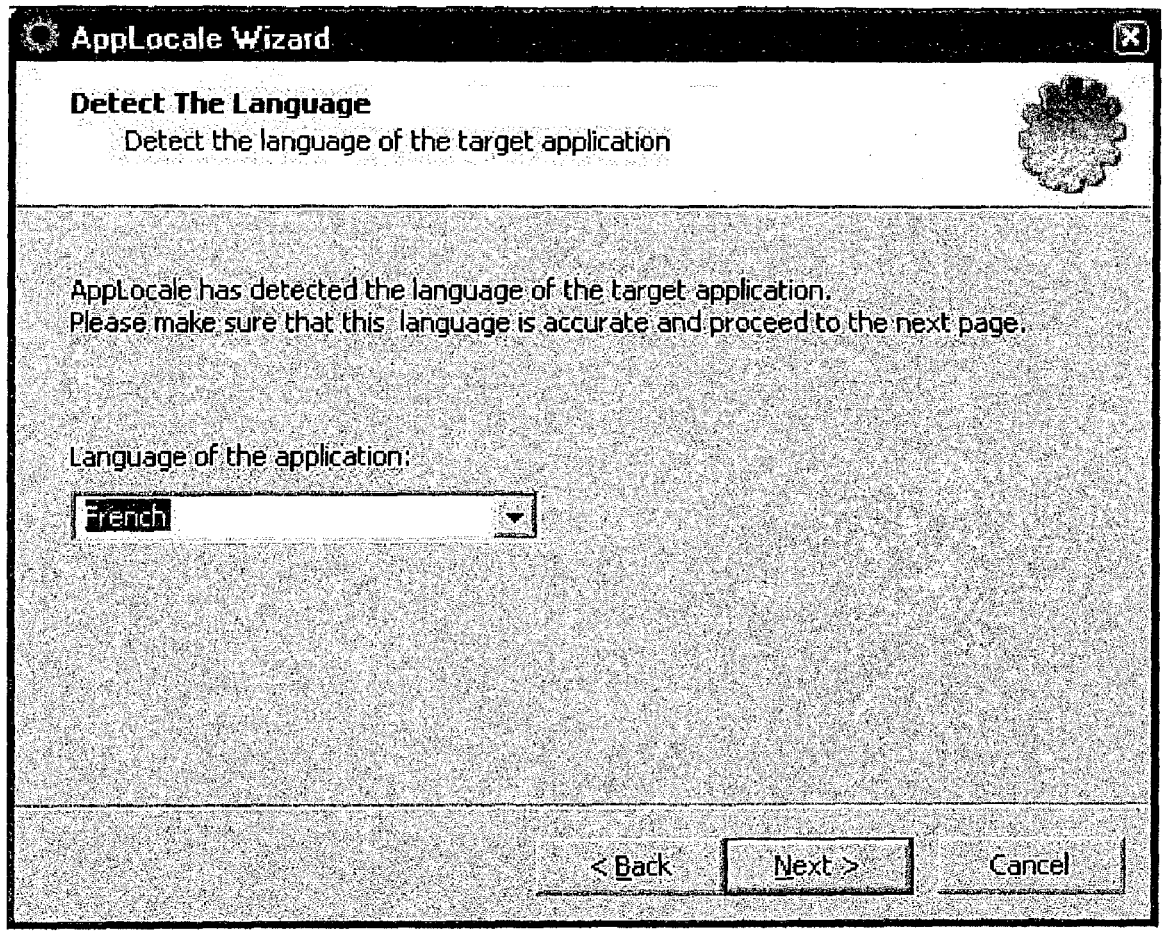

As described above, many program developers do not set the language correctly in the application version, but rather often leave the language stamped as United States, since many localized application are localized from the English version of the application. Thus, as described above, if the detected language is set for English, language detection automatically fails. FIG. 9 provides an interface by which the customer manually specifies the language, while FIG. 10 essentially represents a "finish-to-confirm" or "go back" dialog. Such a user interface preferably also provides an edit function, by which a user can manually add an application or remove an application from the application list.

An alternative to the pre-configuration wizard model generally described above will allow users to dynamically apply shim technology to a launched application program. In general, when a user launches a script-dependent application program with a non-corresponding system locale variable set, and thus sees incomprehensible characters on the application program's user interface, the user will be able to invoke the functionality of the present invention. For example, the user can launch a language detection program like the above-described AppLocale wizard and drag and drop its icon from the system tray or wizards user interface to the application's user interface, which will then detect the language and dynamically apply the shim to the script-dependent application. To this end, the wizard program may, for example, obtain the application window handle and application process ID (PID), and attach the shim to the application. After the shim is launched, the wizard can then send a refresh message to the script-dependent application to update is user interface with meaningful characters. As can be readily appreciated, with such dynamic shim applying mechanism, the user does not need to know the location of application and/or the file name, and instead can simply apply the technology when incomprehensible characters are seen. Note that the pre-configuration-type wizard may still be needed, such as for application programs that cannot be dynamically configured in this manner.

As can be seen from the foregoing detailed description, there is provided a method and system for simulating a corresponding system locale on a per-application basis for script-dependent to unified character set conversions, and vice-versa. The present invention facilitates the execution of older or otherwise non-Unicode compliant applications that rely on other standards, to run on Unicode-capable platforms with a full Unicode encoding system, thereby facilitating convenient multilingual computing on various language versions of the operating system. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At a computer system having an operating system and one or more codepage-based application programs running on the operating system, the computer system configured to uses an active codepage, selected from among a plurality of different codepages accessible to the computer system, to render application program text to the operating system, the active codepage representing an actual system locale for the computer system and a default mapping for converting application program text to a unified data format compatible with the operating system, a computer-implemented method for using an non-active code page to simulate a different system locale for application program text that can not be compatibly converted to the unified data format using the default mapping of the active codepage, the method comprising:

an application program issuing a function call that directs communication, including application program text, to the operating system, the application program text in a codepage-based data format designed for use with a non-active code page such that the application program text can not be compatibly converted to the unified data format using the default mapping of the active codepage, the non-active code page representing a different system locale than the actual system locale and including a mapping designed for compatibly converting application text from the codepage-based data format to the unified data format;

a shim layer intercepting the issued function call directed to the operating system;

the shim layer determining that the function call includes the application program text;

the shim layer referring to a list of one or more application programs that are to have function calls redirected for converting corresponding application program text into the unified data format, application programs included in the list configured for use with non-active codepages;

the shim layer determining the application program is included in the list of one or more application programs that are to have function calls redirected;

the shim layer utilizing a tracking variable to identify the non-active codepage designed for use with the application program, from among the plurality of accessible codepages, in response to the function call including the application program text and in response to the application program being included in the list of application programs that are to have function calls redirected;

the shim layer accessing the identified non-active code page;

the shim layer utilizing the identified non-active code page to convert the included application program text from the codepage-based data format to the unified data format; and the shim layer forwarding the function call, including the converted application program text, to the operating system such that it appears to the operating system that the application program uses the unified data format for application program text.

2. The method of claim 1 wherein converting the application program text from the codepage-based data format to unified data format comprises converting codepage-based data to Unicode data.

3. The method of claim 1 further comprising, receiving a communication back from the operating system directed to the application program, the communication including unified data, converting the unified data to code-page data based on the mapping in the non-active code page, and communicating the code-page based data to the program.

4. The method of claim 3 wherein converting the unified data to code-page based data comprises converting Unicode data to codepage-based data.

5. The method of claim 1 further comprising, receiving another communication initiated at a second different application program and directed to the operating system, the communication including second application program text in a second different codepage-based data format, converting the second application program text to unified data based on a second different non-active code page, selected from among the plurality of accessible codepages, and communicating the converted second application program text to the operating system such that it appears to the operating system that the second different application program uses the unified data format for application program text.

6. The method of claim 1 further comprising, automatically detecting a language corresponding to the application program.

7. The method of claim 6 further comprising, determining whether the language detected for the application program corresponds to the actual locale setting, and if not, launching the shim layer to receive the communication from the application program.

8. The method of claim 1 further comprising, associating language information with the application program.

9. The method of claim 8 wherein associating the language information with the application program comprises, providing a wizard for interfacing with a user.

10. The method as recited in claim 1, wherein intercepting an issued function call comprising intercept an API call.

11. The method as recited in claim 1, further comprising:
the first application program communicating with the operating system through the shim layer; and
a second application program simultaneously communicating with the operating system through reference to the active codepage.

12. The method as recited in claim 11, further comprising:
the operating system appropriately displaying application program text from the first application program and appropriately displaying application program text from the second application program simultaneously on a display device connected to the computer system.

13. A computer-readable medium for performing the method of claim 1.

14. At a computer system having an operating system and one or more codepage-based application programs running on the operating system, the computer system configured to use an active code page, selected from among one or more codepages accessible to the operating system, to render application program text to the operating system, the active code page representing an actual system locale for the computer system and a default mapping for converting application program text to a used to a unified data format compatible with an operating system, a system configured to convert application program text from a codepage-based data format designed for use with a non-active code-page the unified data format for compatibility with the operating system, the system comprising:
a shim layer for performing the following:
intercepting function calls issued from application programs directed to the operating system;
determining that function calls include application program text;
referring to a list of one or more application programs that are to have function calls redirected for converting corresponding application program text into the unified data format, application programs included in the list configured for use with non-active codepages;
determining that application programs are included in the list of one or more application programs that are to have function calls redirected;
utilizing a tracking variable to identify a non-active codepage designed for use with an application program, from among the plurality of accessible codepages, in response to an intercepted function call including application program text and in response to an application program being included in the list of application programs that are to have function calls redirected;
accessing identified non-active code page;
utilizing the identified non-active code pages to convert included application program text from the codepage-based data format to the unified data format; and
forwarding function calls, including converted application program text, to the operating system such that it appears to the operating system that the application program uses the unified data format for application program text.

15. The system of claim 14 wherein converting the application program text from the codepage-based data format to unified data format comprises converting codepage-based data to Unicode data.

16. The system of claim 14 wherein layer is further configured to use the non-active codepage to convert application program text from the unified data format to the codepage-based data format when application program text is sent from the operating system to the application program.

17. At a computer system having an operating system and one or more codepage-based application programs running on the operating system, the computer system configured to uses an active codepage, selected from among a plurality of different codepages accessible to the computer system, to render application program text to the operating system, the active codepage representing an actual system locale for the computer system and a default mapping for converting application program text to a unified data format compatible with the operating system a system configured to use an non-active code page to simulate a different system locale for application program text that can not be compatibly converted to the unified data format using the default mapping of the active codepage, the system comprising:
means for intercepting issued function calls directed to the operating system;
means for determining that function calls include application program text;
means for referring to a list of one or more application programs that are to have function calls redirected for converting corresponding application program text into the unified data format, application programs included in the list configured for use with non-active codepages;
means for determining that an application program is included in the list of one or more application programs that are to have function calls redirected
means for utilizing a tracking variable to identify non-active codepages designed for use with application programs, from among the plurality of accessible codepages, in response to the function calls including application program text and in response to application programs being included in the list of application programs that are to have function calls redirected;
means for accessing an identified non-active code page;
means for utilizing an identified non-active code page to convert included application program text from a codepage-based data format to the unified data format; and
means for forwarding function calls, including converted application program text, to the operating system such that it appears to the operating system that application programs use the unified data format for application program text.

18. The system of claim 17 wherein the means for utilizing an identified non-active code page to convert included application program text from a codepage-based data format to unified data format comprises means for converting codepage-based data to Unicode data.

19. The system of claim 17 further comprising, means for receiving a communication back from the operating system directed to the application program, the communication including unified data, means for converting the unified data to codepage-based data based on the mapping in the non-active code page, and means for communicating the codepage-based data to the application program.

20. The system of claim 19 wherein the means for utilizing the non-active code page to convert unified data to codepage-based data comprises means for converting Unicode data to codepage-based data.

21. The system of claim 17 further comprising, means for receiving another communication initiated at a second different application program and directed to the operating system, the communication including second application program text in a second different codepage-based data format, means for converting the second different codepage-based data to unified data based on a second different non-active code page, selected from among the plurality of accessible codepages, and means for communicating the converted second application program text to the operating system such that it appears to the operating system that the second different application program uses the unified data format for application program text.

22. The system of claim 17 further comprising, means for automatically detecting a language corresponding to the application program.

23. The system of claim 22 further comprising, means for determining whether the language detected for the application program corresponds to the actual system locale setting, and if not, for launching a shim layer to receive the communication from the application program.

24. The system of claim 17 further comprising, means for associating language information with the application program.

25. The system of claim 24 wherein the means for associating the language information with the application program comprises, means for providing a wizard for interfacing with a user.

26. At a computer system having an operating system and one or more codepage-based application programs running on the operating system, the computer system configured to use an active codepage selected from among a plurality of different codepages accessible to the computer system, to render application program text to the operating system, the active codepage representing an actual system locale for the computer system and a default mapping for converting application program text to unified data format compatible with the operating system, a system configured to use an non-active code page to simulate a different system locale for application program text that can not be compatibly converted to the unified data format using the default mapping of the active codepage, the system comprising:

a shim layer means for performing the following:
intercepting function calls issued from application programs directed to the operating system;
determining that function calls include application program text;
referring to a list of one or more application programs that are to have function calls redirected for converting corresponding application program text into the unified data format, application programs included in the list configured for use with non-active codepages;
determining that application programs are included in the list of one or more application programs that are to have function calls redirected;
utilizing a tracking variable to identify a non-active codepage designed for use with an application program, from among the plurality of accessible codepages, in response to an intercepted function call including application program text and in response to an application program being included in the list of application programs that are to have function calls redirected;
accessing identified non-active code pages;
utilizing the identified non-active code pages to convert included application program text from the codepage-based data format; and
forwarding function calls, including converted application program text, to the operating system such that it appears to the operating system that the application programs use the unified data format for application program text.

27. The system of claim 26 wherein the shim layer means includes means for detecting an appropriate non-active codepage for an application program via an automatic detection process means.

* * * * *